S. S. TURNER.
Sewing-Machines.
No. 133,553. Patented Dec. 3, 1872.
10 Sheets--Sheet 10.
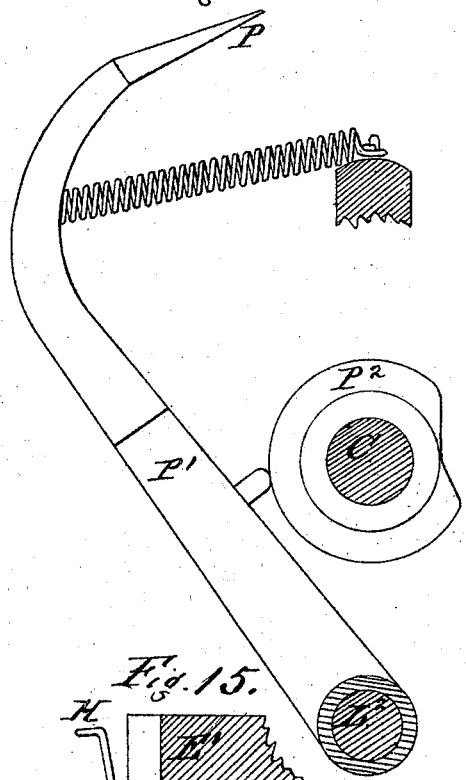
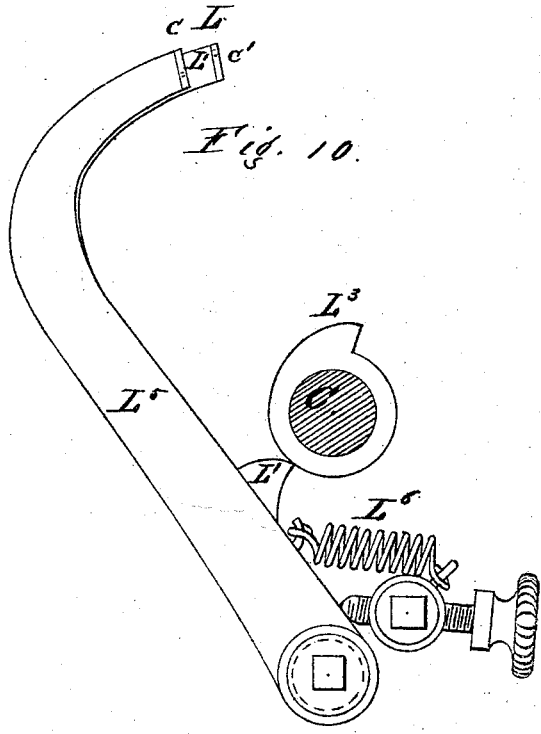
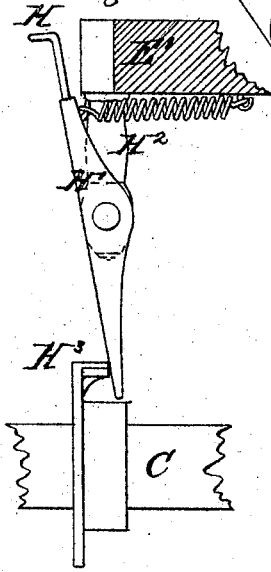
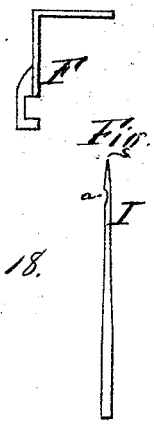
Witnesses.
W. L. Bennem.
Louis Seaman
Inventor
S. S. Turner
by his attorney
E. S. Renwick

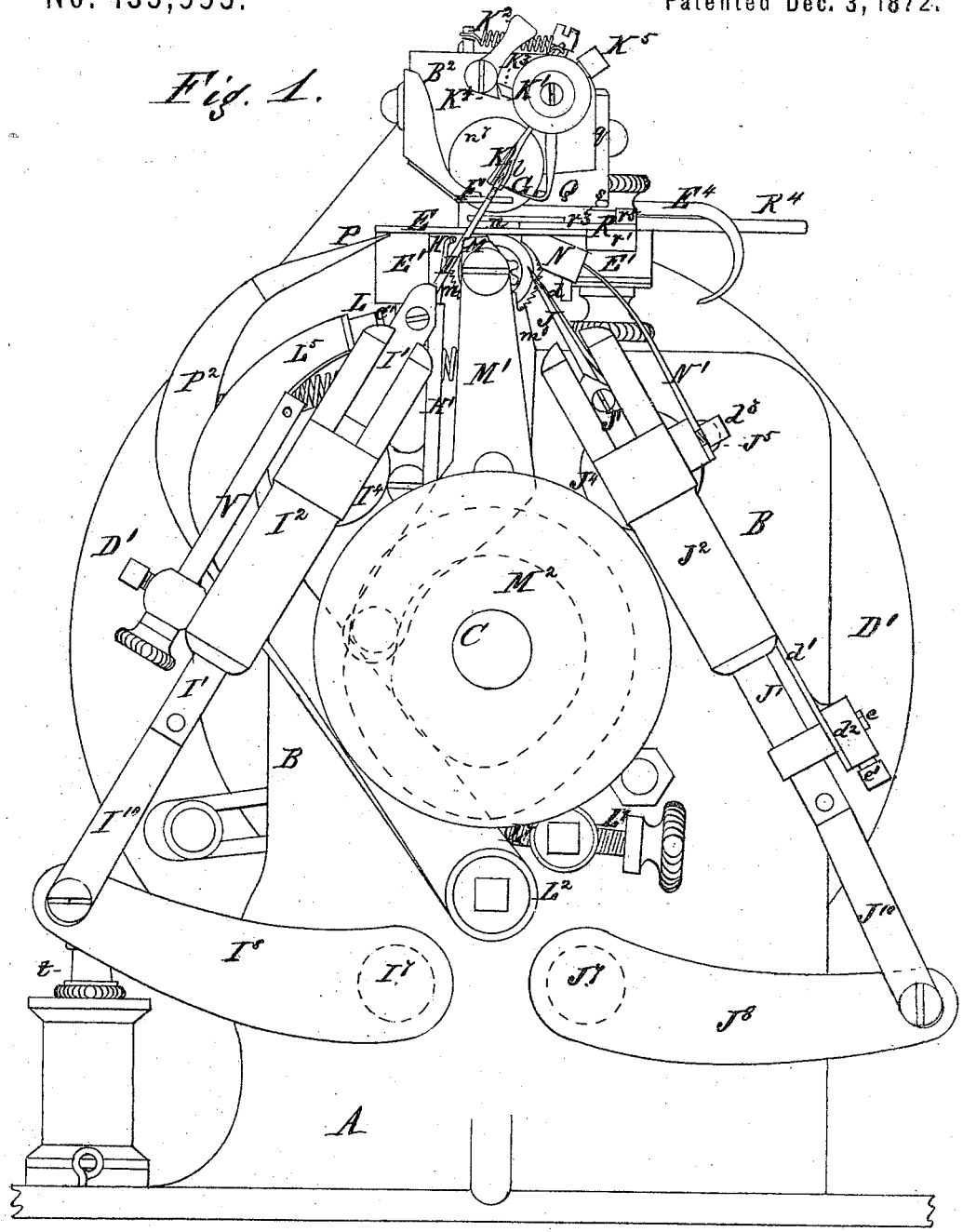

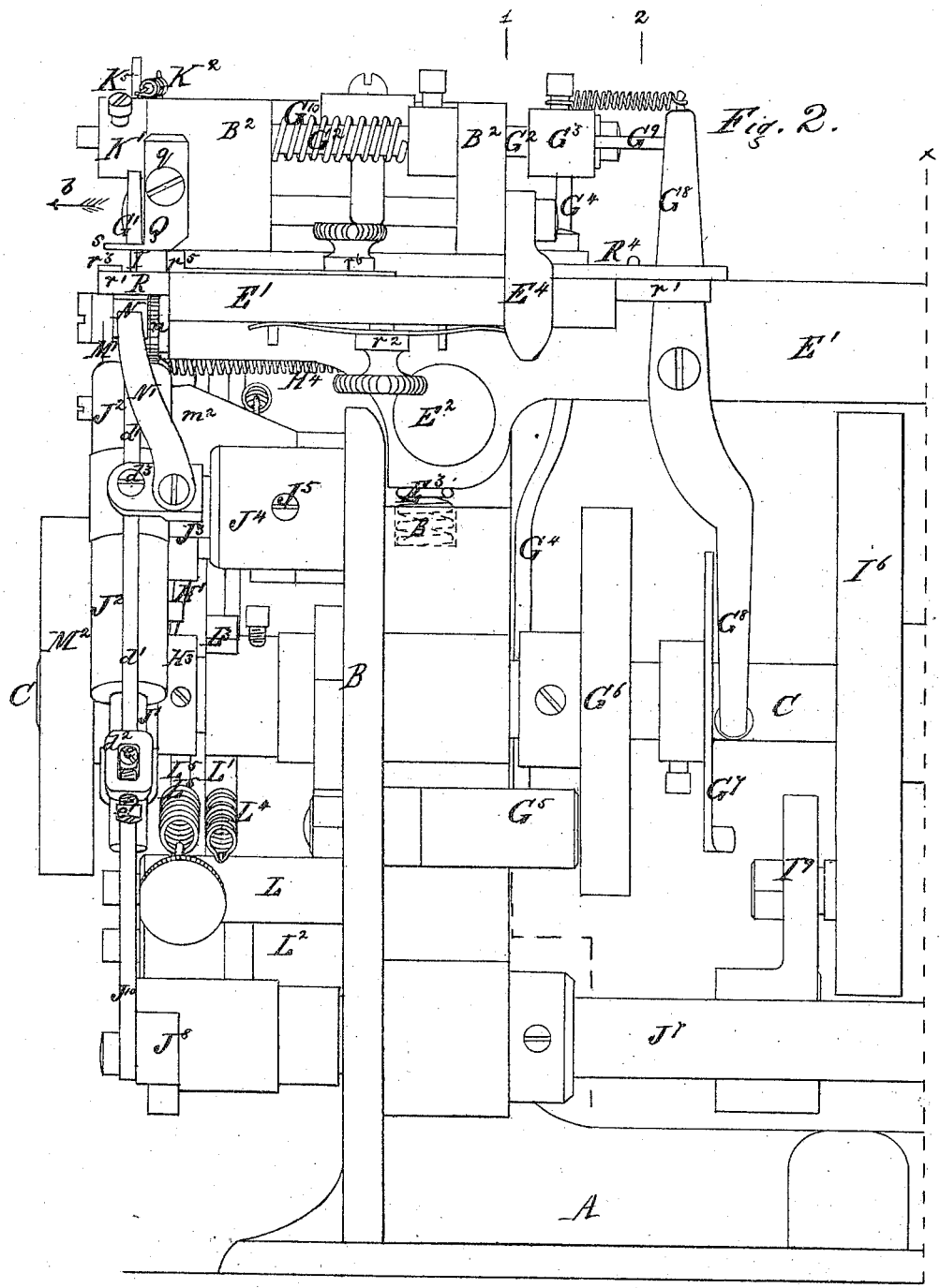

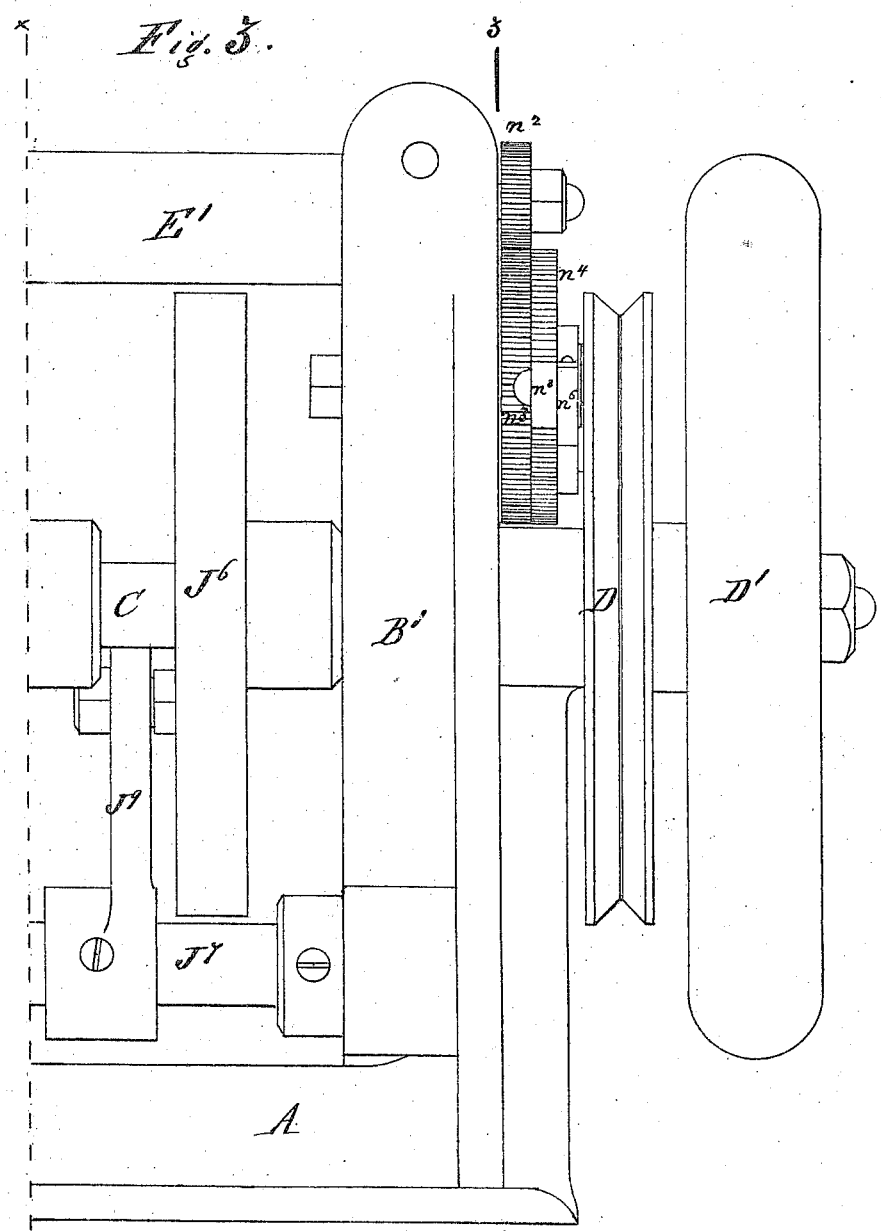

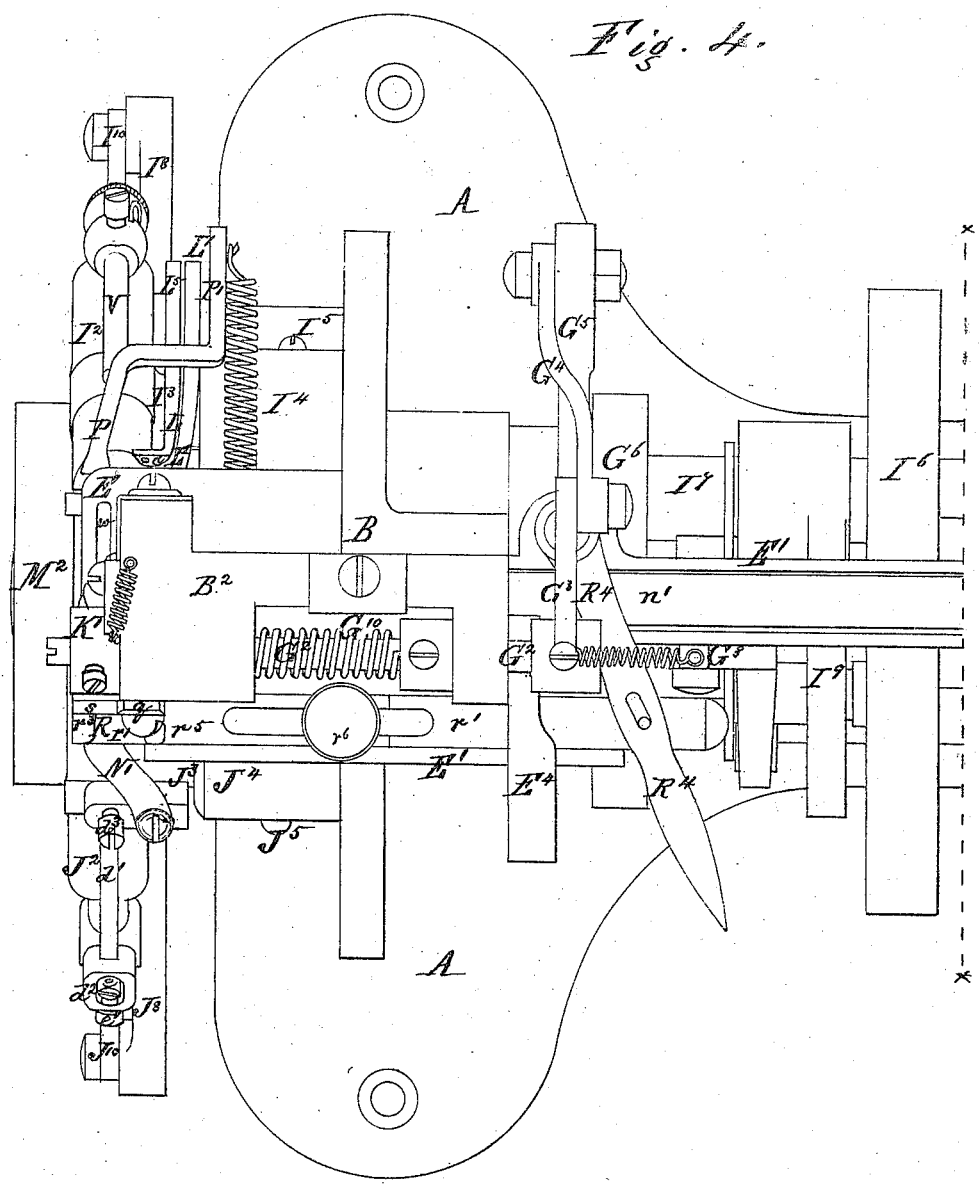

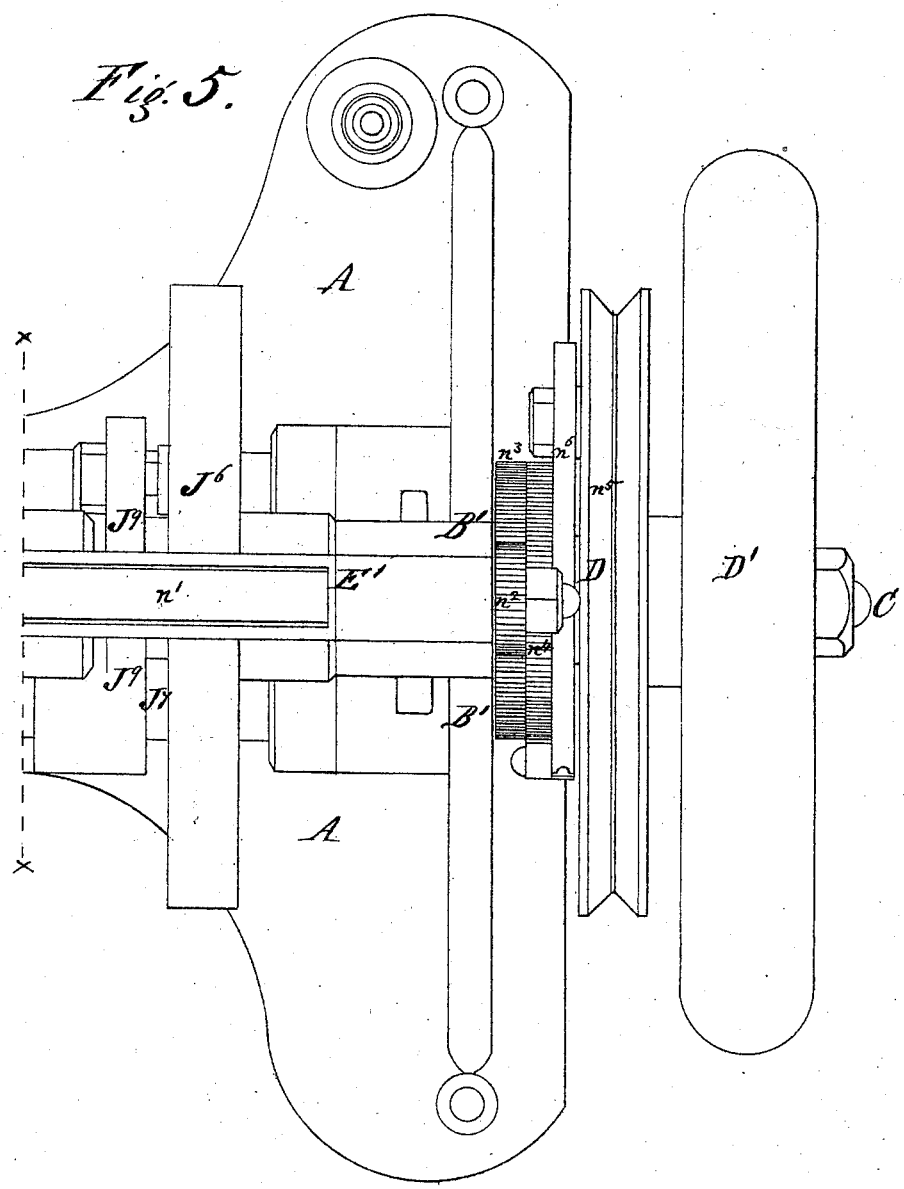

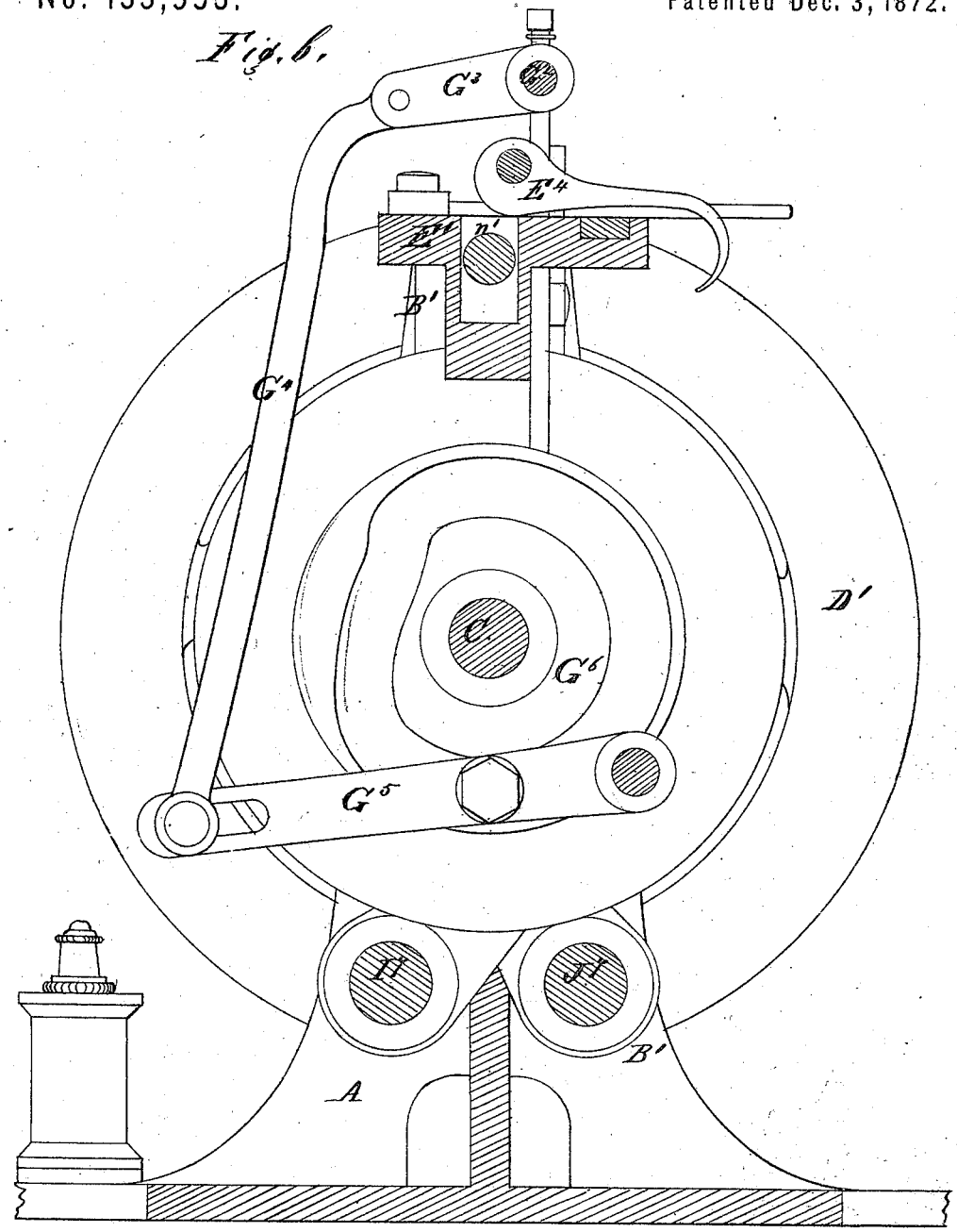

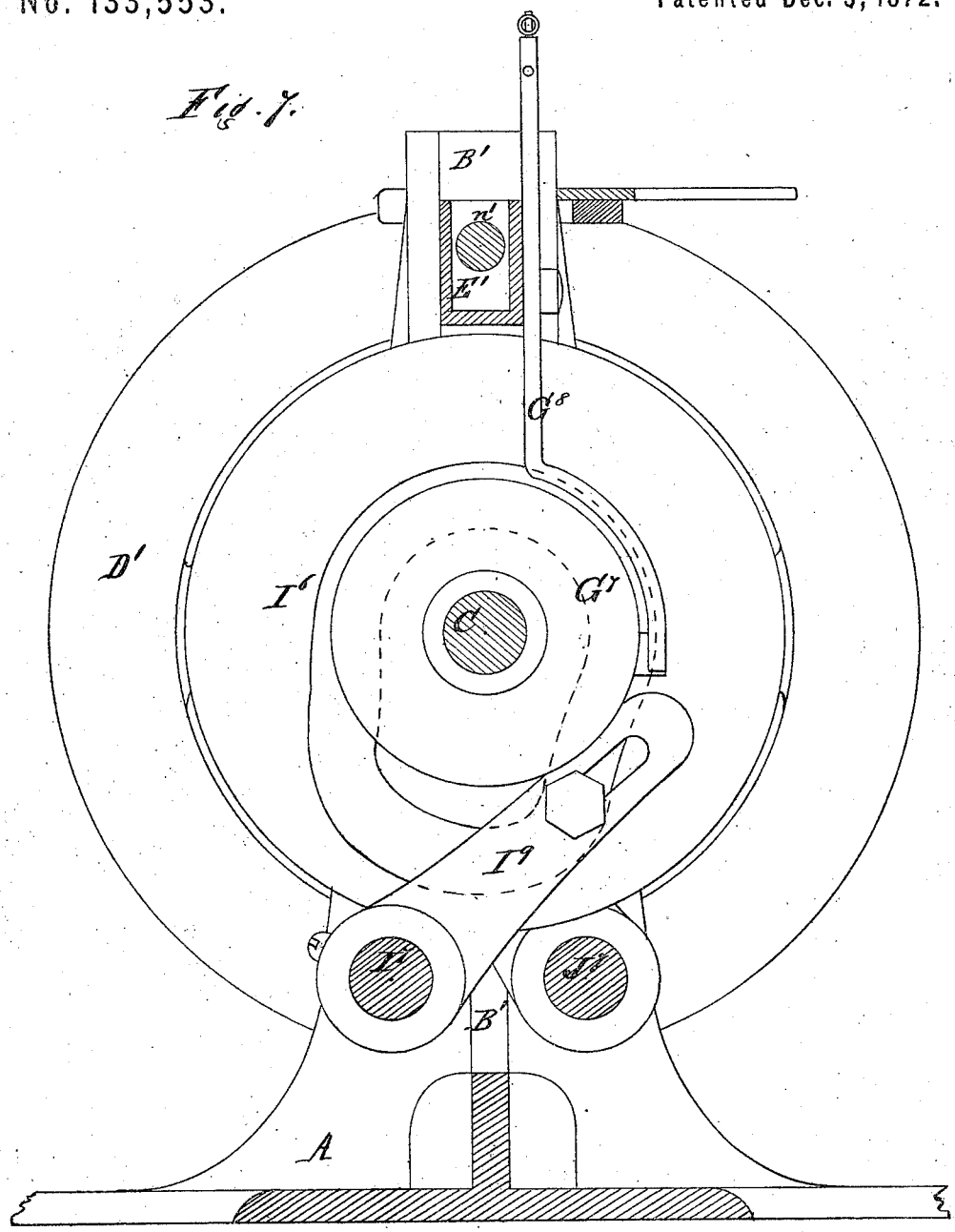

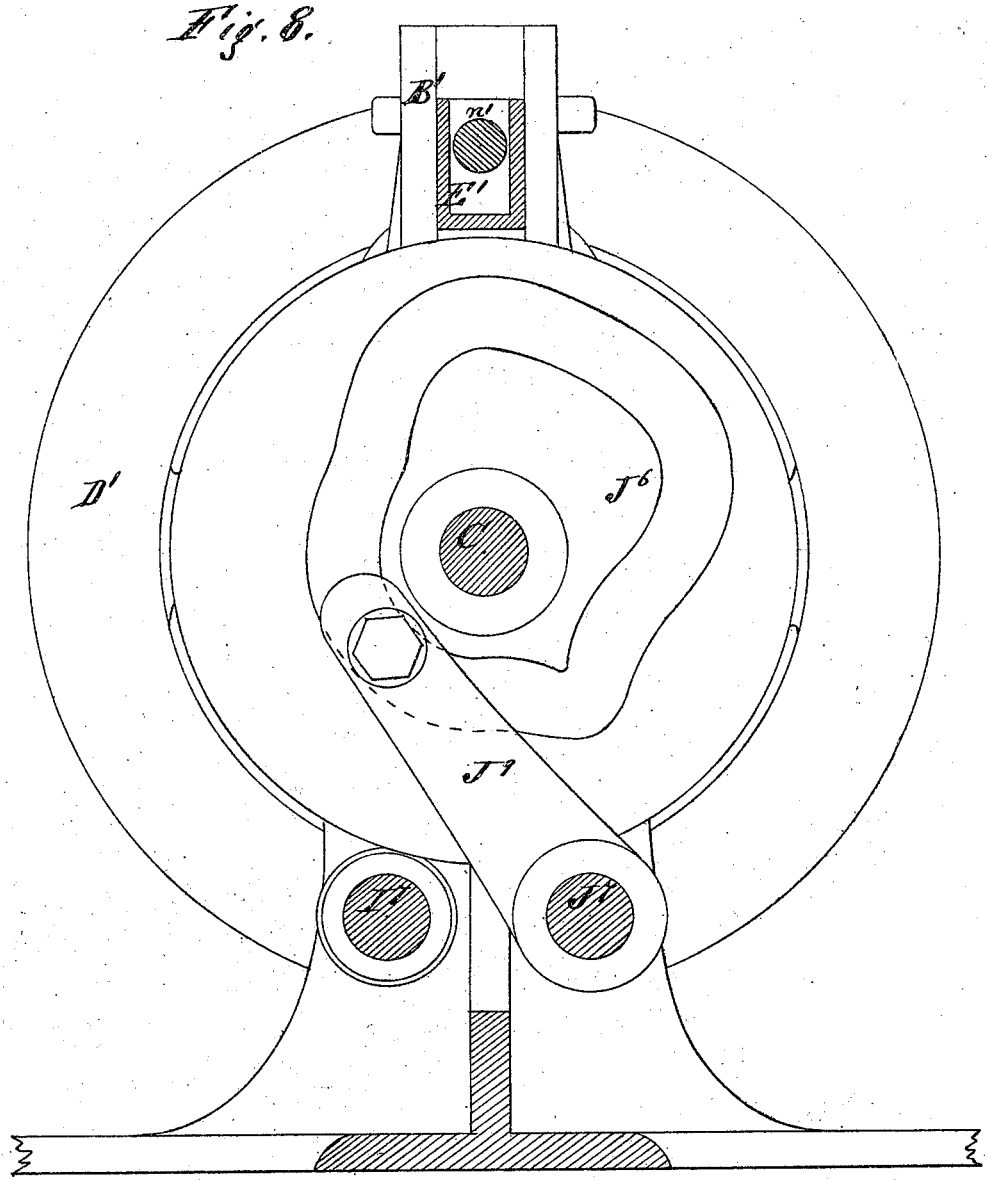

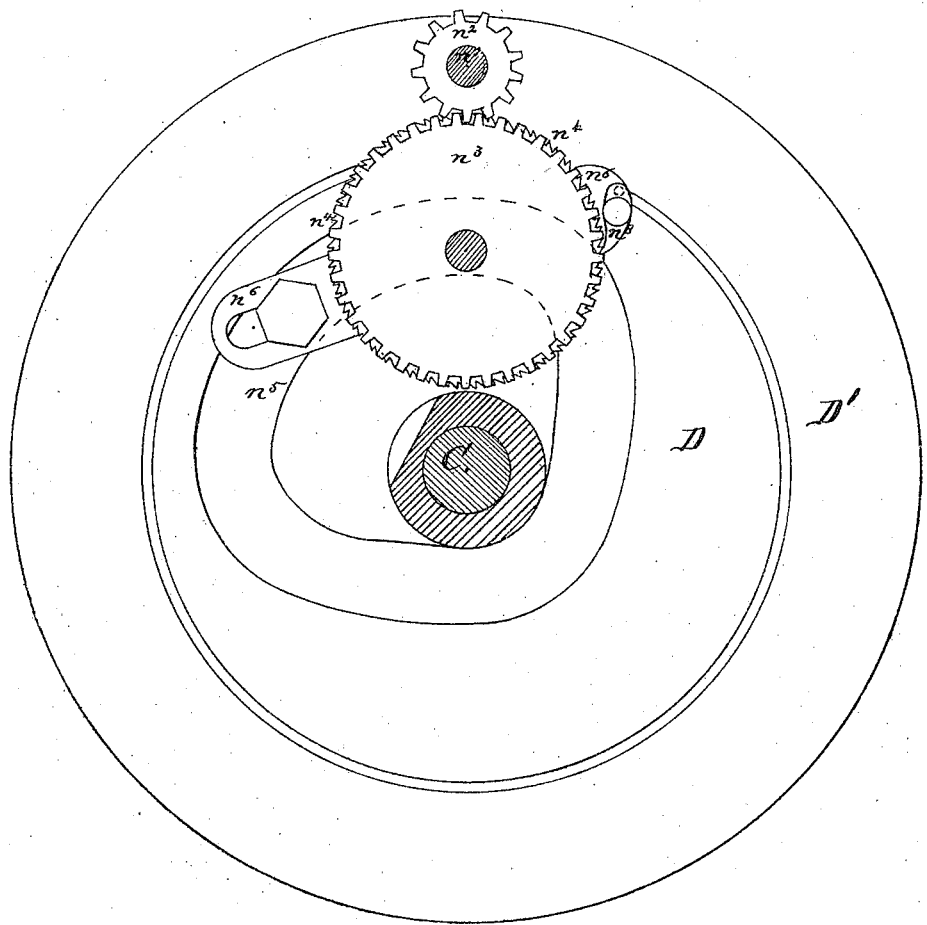

UNITED STATES PATENT OFFICE.

SIDNEY STEVENS TURNER, OF WESTBOROUGH, MASSACHUSETTS, ASSIGNOR TO AMERICAN STRAW-SEWING-MACHINE COMPANY, OF MASSACHUSETTS.

IMPROVEMENT IN SEWING-MACHINES.

Specification forming part of Letters Patent No. 133,553, dated December 3, 1872.

*To all whom it may concern:*

Be it known that I, SIDNEY STEVENS TURNER, of Westborough, in the county of Worcester and State of Massachusetts, have made an invention of certain new and useful Improvements in Sewing-Machines; and that the following is a full, clear, and exact description and specification of the same.

The principal object of my invention is to enable straw braid to be sewed with facility and speed; but some of my improvements are applicable to other purposes. My invention consists of certain combinations of mechanical instrumentalities, of which the following are the principal, viz: The main frame of the machine, which supports the driving-shaft and the movable parts; a movable table-plate upon which straw braid or other material to be sewed is supported, and which is self-adjustable, so that it may change its position to suit braid of varying thickness without changing the appearance of the seam at the upper surface of the material; a stationary foot, at rest, to hold the braid against the thrust of the needle; a reciprocating eye-pointed needle for perforating the straw braid and passing loops of thread through it; a reciprocating perforating-hook for perforating the straw braid, seizing the loops of needle-thread, and drawing them through the braid; a swinging needle-guide which enables the needle to be set to perforate the braid at different points; a swinging hook-guide which enables the hook to be set to perforate the braid at different points; a reciprocating looper for seizing the loop of needle-thread passed through the braid by the needle and presenting it for the entrance of the perforating-hook; a retainer to take up and give back a portion of the loop of needle-thread, as required in the formation of the seam; a looper-guard to prevent the loop of needle-thread from escaping from the looper until the proper time in the formation of the stitch, and then to release it; a reciprocating nippers to seize the needle-thread and draw it backward so as to draw the loop upon the perforating-hook; a shield for the perforating-hook to prevent the barb of the hook from tearing the braid in its backward movement; a loop-holder to receive the loop of needle-thread from the perforating-hook and to present it in an opened condition for the entrance of the needle; a loop-guard to prevent the loop from eluding the loop-holder during the delivery of the loop to it by the perforating-hook; a loop-detacher to operate upon the loop presented to the needle by the loop-holder and prevent the loop from being caught by the loop-holder during its backward movement; a stationary guide to determine the position of the fabric relatively to the needle; a movable braid-holder to adjust the position of the braid so that it may be sewed with a wider or narrower lap as required; a movable gage to fit the braid-holder to braids of different breadths; a feeding mechanism for causing the work to progress past the needle and perforating-hook; a thread-tension to apply the requisite tension to the needle-thread.

The combinations of the said instruments which constitute my invention are specified at the close of this schedule; and, in order that they may be fully understood, I will proceed to describe a straw-sewing machine in which I have embodied them in the best form now known to me.

Figure 1 of said drawing represents a front view of the machine. Fig. 2 represents a side view of the front part of the machine; and Fig. 3 represents a side view of the rear part of the same, $x\,x$ being the dividing-line between the two figures. Fig. 4 represents a plan of the front part of the machine; and Fig. 5 represents a plan of the rear part of the same, $x\,x$ being the dividing-line between the two figures. Figs. 6, 7, 8, and 9 represent vertical cross-sections of the machine at the lines 1, 2, $x$, and 3 of Figs. 2 and 3. Figs. 10 to 18, inclusive, represent views of detached parts of the machine, designated by the same letters as the same parts are in the preceding figures.

I prefer to construct the frame A of my machine in the form represented in the drawing, with two standards, B B$^1$, in which the driving-shaft C is supported. This shaft is fitted at its rear end with the belt-pulley D, for the driving-belt, and with the fly-wheel D$^1$; it also has various cams, I$^6$ J$^6$ G$^6$ G$^7$ H$^3$ L$^3$ M$^2$ P$^2$ $n^5$, secured to it, by means of which the operating instruments of the machine are caused to move in the required manners, at the required times, and to the requisite extents. The mechanism by means of which the sewing is effected is arranged at the front end of the machine, and the material to be sewed is supported there upon a table-plate, E, which is movable in an upward and downward direction. To this end it is connected with an arm, $E^1$, which is pivoted at its rear end to the rear standard $B^1$ of the frame A, and is guided in moving up and down by a smooth portion of the edge of the front standard B, with which the arm is held in contact by means of a bolt, $E^2$, passing through a slot in the arm. A spring, $E^3$, is arranged in a socket in the standard B to press the arm $E^1$ and the table-plate E upward with a yielding pressure; and a lever, $E^4$, is fitted to the back of the head of the front standard B of the frame, to enable the arm and the table-plate E to be depressed when work is to be introduced into or removed from the machine. Above the table-plate is the stationary rest F, which prevents the work from yielding to the thrust of the needle I, which is arranged to enter the work from its under side. This rest F is slotted (see Fig. 16) to permit the needle I and the perforating-hook J to play through it, and it is secured to the head $B^2$ of the front standard B of the frame. The eye-pointed needle I and the perforating-hook J are each secured to a reciprocating stock or bar, $I^1$ $J^1$; and they are arranged to move at an angle with each other, so that their two tracks cross each other at or about the under surface of the rest F, and consequently at or about the upper surface of the work bearing against that rest, so that the thread, after being passed in a slanting-upward direction through the work to its face, is drawn downward through the work in a direction diverging from the upward direction. The needle-bar $I^1$ is arranged to slide longitudinally in a guide, $I^2$, which is constructed with a trunnion, $I^3$, Fig. 4, and this trunnion is arranged to turn in a bearing, $I^4$, secured to the front standard B of the frame. This construction permits the needle-guide to be swung or oscillated so as to vary the angle at which the needle enters the work, and consequently to vary the point or position at which the perforation is effected. The swinging needle-guide may be fixed in the desired position by means of a set-screw, $I^5$, which is screwed into its trunnion-bearing $I^4$, and bears against the trunnion. The needle-bar is caused to reciprocate by means of the grooved cam $I^6$, the rock-shaft $I^7$, and the arms $I^8$ $I^9$, the needle-bar being connected with the front arm $I^8$ of the rock-shaft by means of a link, $I^{10}$, and the rear arm $I^9$ of the rock-shaft being fitted with a friction-wheel, which is received into the groove of the cam. The bar $J^1$ of the perforating-hook is arranged to slide in a swinging guide, $J^2$, constructed similar to the swinging needle-guide $I^2$, with a trunnion, $J^3$, and trunnion-bearing $J^4$, a set-screw, $J^5$, being screwed into the bearing to bear against the trunnion and fix the hook-guide in the position in which it may be set. A reciprocating motion is imparted to the hook-bar by means of the cam $J^6$, rock-shaft $J^7$, and arms $J^8$ $J^9$, the hook-bar being connected with the front end of the front arm $J^8$ by means of a link, $J^{10}$, and the rear arm $J^9$ being fitted with a friction-wheel, which runs in the groove of the cam $J^6$. The needle has a notch, $a$, Fig. 17, formed in its front side, below the eye, to permit the point of the looper to enter the loop of thread carried by the needle. The looper G, by means of which the loop of needle-thread passes through the work, by the ascent of the needle is taken and held for the entrance of the perforating-hook, is hook-formed, and its shank $G^1$ is secured to the head of a rock-shaft, $G^2$, by means of which the head of the looper is caused to reciprocate across the tracks of the needle I and perforating-hook J. The head of the looper is wedge-formed (see Fig. 18) and flat, so that its point may readily enter the loop of needle-thread, and that the continued movement of the head into the loop may spread it laterally so as to insure the entrance of the perforating-hook. The looper rock-shaft $G^2$ is fitted with an arm, $G^3$, which is connected by a link, $G^4$, with the end of a vibrating arm, $G^5$, beneath, and the latter is fitted with a friction-wheel which runs in the groove of the cam $G^6$. The edges of the looper diverge about equally in opposite directions from the line in which its point is caused to oscillate by the rocking of its rock-shaft $G^2$, and consequently the inner edge of the looper would crowd against the adjacent side of needle and push the latter out of its line of movement, unless some provision were made to prevent such effect. The provision for this purpose in the machine consists in constructing the looper rock-shaft $G^2$ to move endwise in its bearings, and a cam, $G^7$, is provided to so move it while it rocks. This cam operates through the intervention of a lever, $G^8$, and a piston, $G^9$, to move the rock-shaft and looper outward, in the direction of the arrow $b$, Fig. 2, as the looper passes by the needle to take the loop of needle-thread from it; and when the needle has been retrograded, leaving the loop of thread upon the looper, the looper rock-shaft and the looper are moved inward by the action of a spring, $G^{10}$, so as to place the center of the looper in the plane of movement of the perforating-hook, or nearly so, and thus hold the loop for the entrance of that hook. As one purpose of the looper is to spread the loop of needle-thread, sufficient slack thread must be provided to permit such spreading. To this end the thread-retainer H, Figs. 1 and 15, is provided. This instrument is a small finger which is arranged beneath the table-plate crosswise to the line of the seam, so that it can be introduced (by moving it endwise outward) over the thread extending from the last stitch to the needle I, when the needle is in its lowest position. Hence, when the retainer is in this position and the needle is raised the thread is bent out of a straight course at the under side of the material. The retainer is held in this position until the needle reaches its highest point, when the retainer is withdrawn by moving it endwise inward. Such withdrawal permits the thread to be drawn straight, and thus furnishes slack for the spreading of the loop by the looper during the descent of the needle. In order that the thread-retainer may be operated, it is secured to the upper end of the lever $H^1$, which is pivoted to a bracket, $H^2$, (projecting downward from the front end of the movable arm $E^1$ of the table-plate,) and the retainer is operated by a face-cam, $H^3$, that is secured to the main shaft C. The cam effects the outward movement of the retainer and permits it to be withdrawn at the proper time by means of a spring, $H^4$. In order to prevent the loop from accidentally escaping from the looper when the machine is operated rapidly the looper-guard K is provided. This instrument has the form of a flat arm or palm standing in front of the point of the looper. It is secured to a round stock or hub, $K^1$, which is fitted to rock upon the front end of the looper rock-shaft $G^2$. The hub is connected with a spring, $K^2$, which tends to bear the face of the guard against the point of the looper, and to cause it to follow the movements of the looper. The hub is also fitted with a radial pin, $K^3$, and a stop, $K^4$, is secured to the frame of the machine in such a position relatively to the said pin $K^3$ that the latter comes in contact with the stop a little before the looper in its backward movement reaches the position it occupies during the upward movement of the needle. The stop thus stops the guard, as seen in Fig. 1, at the side of the needle opposite that from which the looper advances, and permits the loop to pass from the point of the looper to the perforating-hook; but when the looper advances past the needle and seizes the new loop of thread, the point of the looper comes in contact with the guard, and the latter, being borne against that point by the spring $K^2$, moves with the looper and prevents the escape of the loop until the proper time, as above stated. The stop $K^4$ is made adjustable, so that it may be adjusted to different positions in which the needle may be set, and the guard-hub $K^1$ is caused to move endwise with the looper rock-shaft by connecting it with the latter by means of a screw, $K^5$, whose point enters a ring-groove in that shaft. The under side of the guard-hub $K^1$ is slotted to permit the shank of the looper to pass through it, and also to permit the hub to stop and rest while the looper is completing the latter part of its retrograde movement and the first part of its forward movement. The looper, as before stated, holds the loop open for the entrance of the perforating-hook J, and the latter, having been moved upward through the material and into the loop, receives the loop as the looper withdraws from it. In order to insure the drawing of the loop upon the shank of the perforating-hook the reciprocating-nippers L are provided. This instrument is arranged in the machine so as to operate upon the thread in its passage from the spool to the needle. It is composed of two jaws, $c$ and $c'$, each of which is perforated so as to form an eye (see Fig. 4) for the passage of the thread. Each jaw is secured to a vibrating arm. The arm $L^1$ of one jaw, $C'$, is pivoted upon a stud-pin, $L^2$, projecting from the front standard B of the machine, and is operated by a cam, $L^3$, which is secured to the driving-shaft C and moves the arm away from the needle when the loop of needle-thread is to be drawn onto the body of the perforating-hook. The return movement of the arm and its jaw is effected by a spring, $L^4$. The arm $L^5$ of the other jaw $c$ is pivoted to the same stud-pin $L^2$, and is controlled by a spring, $L^6$, which tends to press the jaw $c$ always toward the other jaw $c'$. A stop, $L^7$, is provided to prevent the arm $L^5$ and the jaw $c$ from approaching the needle as closely as the other jaw can. Hence, when the two jaws approach the needle, the one jaw $c'$ stops, while the other continues to move and separates from the first; but when the jaw $c'$ is moved outward it first closes up the space between it and the other jaw $c$, and then pushes that other jaw in advance of it, the two jaws thus moving outward together. The eye of each jaw is opposite the solid part of the adjacent jaw. Hence, when the jaws are separated, as they are when nearest the needle, the thread will render readily through their eyes; but when the two jaws are moving together the thread is nipped between their adjacent faces with the power of the spring $L^6$ that acts upon the jaw $c$. The form of the cam $L^3$ that operates these nippers is such that the jaws are caused to nip the thread and commence to move outward when the looper G is retrograding, so that they pull the needle-thread downward, and thus draw the loop upon the body of the perforating-hook J when the loop is dropped by the looper; and the nippers are moved inward and release the thread after the loop is securely held by the barb of the perforating-hook. After the loop is secured by the perforating-hook, the latter, retrograding, pulls the loop down through the fabric. In order that the barb of the hook may not tear the material in this movement a shield, $d$, is provided. This shield $d$ consists of a small steel piston, which is arranged to move longitudinally in a longitudinal groove formed in the side of the shank of the perforating-hook J. The piston has a shank, $d^1$, which is fitted to slide longitudinally in a groove in the side of the guide $J^2$ of the hook-bar, and the lower end of the shank terminates in a slotted head, $d^2$, which fits upon a pin, $e$, that projects from the bar $J^1$ of the perforating-hook, so that the said bar in its longitudinal movement tends to carry the shield to and fro with it. The slot of the head $d^2$ is longer than the diameter of the pin $e$, and a set-screw, $d^3$, is provided to press upon the shield-shank $d^1$, and oppose a slight frictional resistance to its movement. Hence, when the arm and perforating-hook move upward, the shield remains stationary until the pin $e$ traverses the length of the slot. The barb of the hook is thus moved away from the end of the shield, and a space is formed between the two for the escape of one loop and the entrance of another loop. As soon, however, as the pin strikes the upper side of the slot, the shield $d$ is moved with the perforating-hook, and accompanies it in its perforation of the material. When, again, the perforating-hook commences to retrograde the shield, being detained by frictional resistance, remains stationary until the barb of the hook comes in contact with the end of the shield, when the pin $e$, striking the lower side of the slot, imparts movement to the shield, so that the latter accompanies the hook in its downward movement, and, being in contact with the point of the barb, prevents the material from getting in front of the barb and being torn thereby. In order that the position of the shield $d$ may be adjusted to that of the barb of the perforating-hook the slot is traversed by a set-screw, $e^1$, whose point receives the pressure of the pin $e$, and thus constitutes an adjustable side for the slot of the head $d^2$. The loop, caught by the perforating-hook, is drawn downward, and is then released from that hook during a slight upward movement of the latter and the consequent removal of the shield $d$ from the barb of the hook. The loop is then carried over and held for the needle to pass upward through it in its next succeeding ascent. In order to take the loop from the perforating-hook, to carry it over to the track of the needle and to present it open for the entrance of the needle, the loop-holder M is provided. This instrument is caused to reciprocate in a curved line from the needle to the perforating-hook. To this end it is formed upon or secured to a stock or hub, $m$, Figs. 11, 12, and 13, which is pivoted to the upper arm of a lever, $M^1$. The lever has a fulcrum-pin which rocks in a bracket projecting from the forward standard B of the main frame, and the lower arm of the lever is fitted with a friction-wheel which runs in the groove of the cam $M^2$ which operates the lever. The lower side of the hub $m$ of the loop-holder is formed into a toothed segment, whose teeth engage with those of a similar stationary segment, $m^1$, that is secured to the bracket $m^2$. Hence, when the hub of the loop-holder is carried to and fro by the vibration of the lever $M^1$ the hub is caused to rock and the looper to move in an epicycloidal curve whose extremities are nearly tangential to the central lines of the needle and perforating-hook. This movement is advantageous, because it permits the loop-holder to perform its work with greater certainty. The loop-holder is perforated with a hole, $e^2$, through which the perforating-hook can ascend when delivering the loop of thread, so that the barb of the hook cannot retain the loop. The portion of the loop-holder above this hole is V-formed, with its point extended toward the perforating-hook and slightly undercut, so that when the hook carrying the loop has descended, and the loop-holder is rocked to a position above the point of the hook, the point of the loop-holder can readily enter into the loop. Then, when the perforating-hook is raised, its point enters the hole of the loop-holder and delivers the loop upon the upper part thereof. As this part is V-formed the loop is spread by it, and, when the loop-holder is subsequently rocked over to the position of the needle, the legs of the V-formed part, separating the two members of the loop, present it in an opened state for the entrance of the needle in its next ascent. In order that the loop may not escape the loop-holder when the loop is rendered up by the perforating-hook, a loop-guard is provided to cover the upper side of the loop-holder at that time. I prefer to make this loop-guard of an elastic material, such as vulcanized India rubber, and to give it the form of a pad, N, which is secured to the end of a spring, $N^1$, in such a position relatively to the tracks of the loop-holder and the perforating-hook that the upper side of the loop-holder comes in contact with the face of the pad as the loop-holder approaches the track of the perforating-hook. The pad or loop-guard then acts as a cap for the loop-holder, and prevents the loop from escaping over it.

The loop-holder, as before stated, carries the spread loop over to the track of the needle, so that the needle may ascend through it before perforating the material for the succeeding stitch, and the loop-holder remains at rest in its position until the perforating hook descends with the new loop, whereupon the loop-holder is rocked over to take it. In order to prevent the hanging of the preceding loop upon the loop-holder during this movement from the needle a loop-detacher, P, is provided to insure its detachment. This instrument, in the present case, has the form of a blunt chisel with its edge arranged horizontally, and it is broad enough to extend beyond the sides of the loop held upon the loop-holder. The loop-detacher is caused to reciprocate across the track of the needle between the under side of the table-plate E and the loop-holder M when the latter is in its position over the needle; and the detacher is pushed forward just before the loop-holder moves toward the perforating-hook, so that the detacher may pass under the loop and raise it from the loop-holder in case it tends to hang thereon. In order that this loop-detacher may be operated properly it is connected with an arm, $P^1$, which is arranged to vibrate upon the stud-pin $L^2$ of the forward standard B of the main frame, and is operated at the proper time and to the required extent by the cam $P^2$, which is secured to the driving-shaft C. The position of the material in the machine relatively to the sewing mechanism is determined by a stationary guide, Q, and a movable braid-holder, R. The guide Q consists, in this instance, of a plate whose shank $q$ is secured to the head $B^2$ of the front standard B of the main frame by means of a screw which is passed through a slot in the said shank, so that the screw may be slacked and the guide adjusted to the required position for guiding the edge of the work to the needle. The guide also is fitted with a projecting braid-guard, $s$, which extends over the braid-holder R in a direction crosswise to the seam, so as to separate the sewed work from the braid which is to be sewed to it, and thus permit the braid to be readily moved laterally. This braid-guard also prevents the braid from being accidentally displaced from the braid-holder. The braid-holder R consists of a slide, $r^1$, and its appurtenances, arranged to slide crosswise to the line of the seam in a groove in the head of the movable arm $E^1$ of the table-plate E. The slide is retained in the groove by means of a screw, $r^2$, which traverses a slot in the head of the arm $E^1$, and has a friction-spring applied to its stem to bear against the under side of the head of the arm and exert sufficient frictional pressure to hold the slide in any position to which it may be moved by the hand of the operator. The front of the slide is fitted with a projection, $r^3$, which determines the position of the front edge of the braid, and the rear of the slide is connected with a hand-lever, $R^4$, by means of which it may be readily moved. The slide $r^1$ carries a gage, $r^5$, whose projecting front end determines the position of the rear edge of the braid. This gage is connected with the slide by means of a clamp-screw, $r^6$, so that its position may be readily changed to adapt the space between the projection $r^3$ of the slide $r^1$ and the projecting end of the gage $r^5$ to receive braids of different breadths; but if the machine is to be used to sew braids of the same breadth, the gage $r^5$ (or its end) may be fixed to the slide. The movable capacity of the braid-holder permits it to be adjusted so as to guide the braid to any desired position relatively to the material above it to which it is to be sewed, and thus determines the lap of the braid. It also permits the lap to be varied (by moving the braid-holder) during sewing, so that the brim of a hat may be widened and narrowed by reducing and increasing the lap of the braid.

The movement of the work through the machine is effected by a wheel-feed. The feeding-wheel $n$ is mounted upon a shaft, $n^1$, which extends through the hollow arm $E^1$ of the table-plate, and protrudes at its rear end. To this shaft a pinion, $n^2$, is secured, whose teeth engage with those of a wheel, $n^3$. This wheel is fitted to turn upon a stud-pin projecting from the rear standard $B^1$ of the main frame, and has a ratchet-wheel, $n^4$, secured to it. The ratchet-wheel is turned at intervals (when feeding is to be done) by means of the feed-cam $n^5$, which is formed in the side of the belt-pulley D, and which operates upon the friction-roller of a vibrating lever, $n^6$, whose shorter arm is fitted with a pawn, $n^8$, which engages with the teeth of the ratchet-wheel. The periphery of the feed-wheel $n$ is toothed so that it may take hold of the work, and it is pressed against the work by the pressure of the spring $E^3$ of the table-plate. The work is held against the pressure of the feed-wheel by a smooth-surfaced presser-wheel, $n^7$, whose shaft is arranged to revolve in bearings in the head of the front standard of the frame. A spool-standard, $t$, is provided to hold the spool of needle-thread, and also sundry eye-guides to direct it. A turning tubular thread-tension, V, also is provided to produce the requisite tension upon the thread between the spool and the needle-eye. The looper-guard K is provided with a cheek, $l$, which stands close to the inner side of the needle when the latter rises, so that when the needle descends slightly the thread is prevented from bowing out at the inner side of the needle and is caused to bow out at the outer side thereof, or that side at which the looper G operates. The table-plate E is perforated with a slot, $w$, to permit the needle and perforating-hook to play freely through it; and the slot is sufficiently long to permit the thread to incline from the last stitch to the needle-eye. It is expedient to notch the side of the needle below the eye thereof, as at $a$, Fig. 7, to facilitate the entrance of the point of the looper into the loop of thread.

In order that material may be introduced into the machine the table-plate E is depressed by bearing on the lever $E^4$. A piece of braid is then applied, end foremost, to the braid-holder R, and is entered under the braid-guard $s$, and between the feed-wheel $n$ and the presser-wheel $n^7$. The piece of braid, or the fabric to which the first-mentioned braid is to be sewed, is introduced over the first braid and beneath the stationary rest F, its edge being borne against the stationary guide Q. The lever $E^4$ is then moved to permit the table-plate to rise and the material to be griped between the opposing surfaces of the feed-wheel and the presser-wheel.

The machine being put in motion, the fabric and the braid are caused, by the revolution of the feed-wheel, to move intermittently through the machine, the edge of the fabric being borne by the operator against the guide Q, and the braid being directed to its proper position by the braid-holder R during sewing. The instruments which operate upon the thread act in the following manner: The needle being at its lowest position, the loop-holder being about midway between the needle and the perforating-hook, the thread-retainer H is moved forward over the thread, extending from the last stitch to the eye of the needle, and the needle ascends, passing through the preceding loop of thread held by the loop-holder, perforates the material, and carries the loop of thread through it. During this ascent the loop-holder is moved toward the needle, the thread-retainer is between the under side of the material and the thread extending from the last stitch, so that such thread is prevented from being at this time drawn straight against the under side of the material. The needle, after perforating the material, continues to ascend and passes between the point of the looper G and the looper-guard K until it reaches its highest position. It then descends slightly and rests a moment (as represented at Fig. 1) while the looper is moved forward to enter the loop of needle-thread. As soon as the point of the looper seizes the loop and advances to the looper-guard K the thread-retainer H is moved backward so as to free the thread below the material, and the needle recommences to descend while the looper continues to advance, and also moves sidewise outward, until the loop is spread and received at the shoulder ($x$, Fig. 18) near the junction of the head and shank of the looper, the thread left slack at the under side of the work by the withdrawal of the thread-retainer being drawn tight by the spreading of the loop above the material. By this time the needle has descended below the looper, which then moves suddenly inward so as to place the center of the loop in the track of the perforating-hook J, which now commences to ascend, while the looper retrogrades and the nippers L gripe the thread and commence to draw it backward. The perforating-hook passes through the material, entering the loop, and continues to ascend. When it reaches its uppermost position the looper withdraws entirely from the loop, and the nippers L, pulling the thread backward, draw the loop tight upon the shank of the hook between its barb and the shield $d$, which has been withdrawn from the barb during its ascent. The perforating-hook, carrying the loop, descends, and, as the shield $d$ remains stationary, by reason of the friction of its shank against the set-screw $d^3$, the barb first closes up the space between it and the shield, after which the perforating-hook and shield descend together, drawing the loop through the material, while the nippers L are moved forward to render up slack thread for that purpose. While the perforating-hook is completing its descent the loop-holder M is rocked toward it, and when the perforating-hook reaches its lowest position, the loop-holder is over it and in contact with the loop-guard N. In moving to this position the point of the loop-holder enters into the loop of thread extending upward from the peforating-hook to the material above, and spreads it. The perforating-hook then ascends a short distance, while the shield $d$ remains stationary, and the head of the hook enters the hole in the loop-holder M. As the presence of the loop-holder within the loop prevents it from being carried upward into this hole the barb, passing upward, lets go the loop, which is caught upon the wedge-shaped under-cut point of the loop-holder, the loop-guard N preventing the loop from eluding the loop-holder at this time. The perforating-hook then descends again so as to back out of the hole in the loop-holder, thus leaving the latter free to move. The loop-holder carrying the loop upon it is then rocked toward the track of the needle, which (having descended to its lowest position during the forward and sudden sidewise movements of the looper) is then at rest in its lowest position, and during such rocking of the loop-holder the feed mechanism operates to move the material in the same direction as the loop-holder is rocked, so that the loop is drawn along with the material, and is thereby held taut upon the loop-holder. While the loop-holder is moving toward the needle the latter commences to ascend, as at first, so that it enters the loop-spread upon the loop-holder, thereby inserting the new loop through the preceding one, as before. As the needle ascends the loop-holder continues to move toward it, and as the line of movement or track of the loop-holder is curved the point of the loop-holder is turned upward to cast off the loop. After each descent of the needle to its lowest position the loop-detacher P is moved forward under the last preceding loop of the thread just before the loop-holder M is rocked toward the perforating-hook J, so that such last loop is detached from the loop-holder in case it has hung upon it.

In the machine above described the material is at rest from the time the needle perforates it until the perforating-hook has descended and the loop-holder is rocked toward the needle. Hence, as the tracks of the needle and perforating-hook cross each other at or about the under surface of the stationary rest F, against which the upper surface of the material bears, the loop of needle-thread is drawn down through the material at or about the point at which it was passed up by the needle, and the stitch is hardly apparent at the upper surface of the material. Moreover, the length of the stitch there seen is always the same, however much the material may vary in thickness, unless the needle-guide $I^2$ and the hook-guide $J^2$ be adjusted to change the angles at which the needle and perforating-hook operate, and consequently the position of the point at which their tracks cross. The adjustment may be such as to make the length of the stitch at the upper side of the material longer or shorter, or even to make the turning point of the loop below the upper surface of the material, in which case the stitch is not seen at that upper surface. While the work is being sewed the stationary guide Q and the braid-holder R direct the material to the feed mechanism and to the sewing mechanism, and the position of the stationary guide Q relatively to the tracks of the needle and perforating-hook determines the position of the same in the fabric; the position also of the movable braid-holder relatively to the said tracks and to the stationary guide determines the extent of the lap of the braid upon the fabric to which it is sewed. If the operator wishes to narrow the fabric the movable braid-holder is moved progressively outward by means of its hand-lever $R^4$ while the sewing is progressing so as to increase the lap of the braid; and if the fabric is to be widened the movable braid-holder is moved inward in like manner so as to decrease the lap.

The machine above described embodies my invention in the best form known to me; but, as the combining mechanism by means of which the principal instrumentalities are caused to operate in combination can be varied greatly without changing in substance their mode of operation, I propose to modify the machine as circumstances may render expedient or to suit the views of users. The loop-detacher P, although desirable for rapid work, may be dispensed with; but in such case it is expedient to give the nippers a larger amount of movement than the nipper's cam of the present machine is capable of imparting, in order to insure the drawing of the loop from the loop-holder. If deemed expedient, parts of the machine may be transposed.

I claim as my invention—

1. The combination, substantially as before set forth, of the stationary rest, the movable table-plate, the eye-pointed needle, and the perforating-hook.

2. Also, the combination, substantially as before set forth, of the eye-pointed needle, the perforating-hook, and the looper, arranged to move point foremost toward the needle from the side thereof at which the perforating-hook is located.

3. Also, the combination, substantially as before set forth, of the looper and the mechanism for both causing it to advance and also to move sidewise to the plane of the track of the needle.

4. Also, the combination, substantially as before set forth, of a looper with a looper-guard movable relatively to said looper so as to prevent the escape of the loop and to permit its escape as required in the operation of the machine.

5. Also, the combination, substantially as before set forth, of the needle, the looper, and the looper-guard, movable relatively to said looper so that the loop of needle-thread may be prevented from escaping and permitted to escape as required.

6. Also, the combination, substantially as before set forth, of the needle with a thread-retainer and a table-plate, both arranged at the same side of the position of the material to be sewed so that the table-plate intervenes between the thread and the position of the said material.

7. Also, the combination, substantially as before set forth, of the thread-retainer (at one side of the table-plate) with the spreading looper at the opposite side thereof so that the former gives up thread to permit the spreading of the loop by the latter.

8. Also, the loop-holder, constructed substantially as before set forth, with a forked head to receive the loop of thread and with a hole for the entrance of the head of the perforating-hook.

9. Also, the arrangement, substantially as before set forth, of the perforated loop-holder and the perforating-hook in such manner that the latter may enter the hole in the former.

10. Also, the combination, substantially as before set forth, of the loop-holder with the mechanism for causing it to rock in a curved track from the track of the perforating-hook to that of the needle, and vice versa, descending as it approaches the track of each of the said instruments.

11. Also, the combination, substantially as before set forth, of the perforating-hook and the needle with the spreading loop-holder which receives the loop from the perforating-hook and presents it in a spread condition for the entrance of the needle.

12. Also, the combination, substantially as before set forth, of the loop-holder and the loop-detacher.

13. Also, the combination, substantially as before set forth, of the needle with the loop-holder for presenting the loop for its entrance and the loop-detacher for insuring the detachment of the loop from the loop-holder.

14. Also, the combination, substantially as before set forth, of the loop-holder and the loop-guard, the former moving independently of the latter and the latter operating, when necessary, to prevent the loop from eluding the former.

15. The combination and arrangement, substantially as before set forth, of the stationary rest, the movable table-plate to support the material for being fed and sewed, and the feeding instrument in such manner that the rest is above the position of the material to be sewed while the movable table-plate and feeding instrument are directly below that position; also, that the movable feeding instrument can operate upon the surface of the material supported on said table-plate, and that the said feeding instrument is connected with the said table-plate so as to move with it.

16. Also, the combination of the loop-holder with the feed mechanism, so that the two are operated simultaneously, whereby the loop is held taut upon the loop-holder.

17. Also, the combination, substantially as before set forth, of the perforated loop-holder, the loop-guard, and the perforating-hook in such manner that the perforating-hook enters the hole of the loop-holder while the latter is in contact with the loop-guard.

18. Also, the combination, substantially as before set forth, of the perforating-hook with a thread-nippers arranged at the same side of the position of the material to be sewed as that at which the hook enters.

19. Also, the combination, substantially as before set forth, of the needle, the perforating-hook, and the movable thread-nippers.

20. Also, the combination, substantially as before set forth, of the needle, the perforating-hook, the looper, and the thread-nippers.

21. Also, the arrangement, substantially as before set forth, of a yielding movable plate, to bear against one side of the material, the needle, and the perforating-hook, at the same side of the position of the material in the machine.

22. Also, the combination, substantially as before set forth, of the yielding movable table-plate, the adjustable swinging needle-guide, and the needle, so that the position of the needle-guide relatively to said movable table-plate may be varied to vary the position at which the perforation of the material supported on said table-plate is effected.

23. Also, the combination, substantially as before set forth, of the yielding movable table-plate, the adjustable swinging hook-guide, and the perforating-hook.

24. Also, the combination, substantially as before set forth, of the perforating-hook, the shield for the barb thereof, and the swinging hook-guide.

25. Also, the combination of the movable braid-holder with a hand-lever, or its equivalent, for enabling the operator to move the braid-holder during the operation of the machine.

26. Also, the combination, substantially as before set forth, of the laterally-movable braid-holder with an adjustable gage which adapts the braid-holder to braids of different breadths.

27. Also, the combination, substantially as before set forth, of the yielding table-plate with a laterally-movable braid-holder, so that the two can move simultaneously, as required by the varying thickness of the material.

28. Also, the combination, as before set forth, of the yielding table-plate, the braid-holder, and the feeding instrument.

29. Also, the combination, substantially as before set forth, of the laterally-movable braid-holder and gage with braid-guard for preventing the braid from escaping from the braid-holder.

30. Also, the combination, substantially as before set forth, of the needle with the laterally-movable braid-holder and gage for directing the braid to said needle.

31. Also, the combination, substantially as before set forth, of the needle, the perforating-hook, and the movable braid-holder for directing the braid to the first two instrumentalities.

32. Also, the combination, substantially as before set forth, of the stationary guide (for determining the position of the partly-completed fabric) with the laterally-movable braid-holder and gage for directing the braid to the fabric to which it is to be sewed.

33. Also, the combination, substantially as before set forth, of the needle, the stationary guide for the fabric, and the laterally-movable braid-holder and gage for the braid.

34. Also, the combination, substantially as before set forth, of the feed mechanism, the stationary guide for the fabric, and the laterally-movable braid-holder and gage for the braid.

35. Also, the combination, substantially as before set forth, of the needle, the stationary guide for the fabric, the laterally-movable braid-holder, and gage for the braid and the feed mechanism.

36. Also, the combination, substantially as before set forth, of the needle, the perforating hook, the stationary guide for the fabric, the movable braid-holder, and the feed mechanism.

Witness my hand this 20th day of December, A. D. 1871.

SIDNEY STEVENS TURNER.

Witnesses:
  HENRY IDE,
  CHAS. B. STOUGHTON.